D. L. BARTLETT.
Expansion Bolts.
No. 137,338. Patented April 1, 1873.
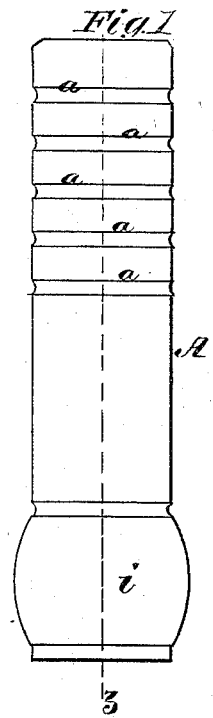
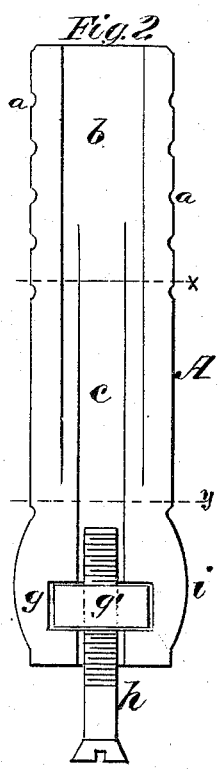
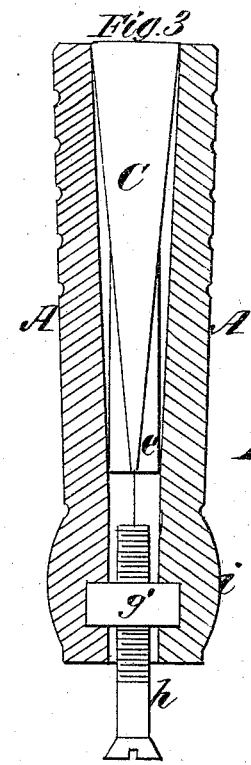
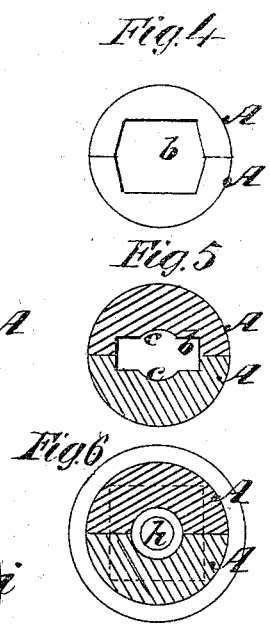
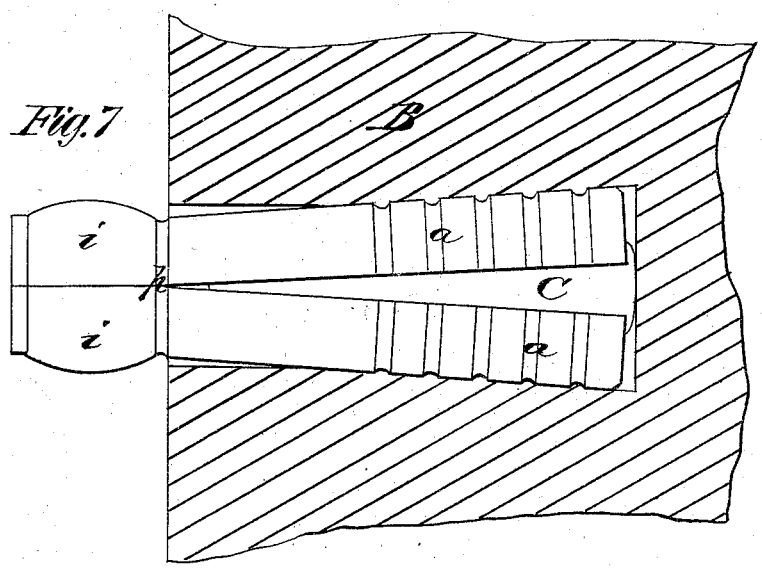

UNITED STATES PATENT OFFICE.

DAVID L. BARTLETT, OF BALTIMORE, MARYLAND, ASSIGNOR TO BARTLETT, ROBBINS & CO., OF SAME PLACE.

IMPROVEMENT IN EXPANSION-BOLTS.

Specification forming part of Letters Patent No. 137,338, dated April 1, 1873; application filed February 20, 1873.

*To all whom it may concern:*

Be it known that I, DAVID L. BARTLETT, of the city of Baltimore, in the county of Baltimore and State of Maryland, have invented a new and Improved Expansion-Bolt; and I do hereby declare that the following is a full, clear, and exact description thereof, reference being had to the accompanying drawing making part of this specification, in which—

Figure 1 is a side view of the improved bolt. Fig. 2 is an inside view of one of the longitudinal halves of the bolt with a nut and screw applied. Fig. 3 is a diametrical section through the bolt in the plane 3, showing the nut and screw confined by a wedge. Fig. 4 is a view of one end of the bolt. Fig. 5 is a section taken in the plane indicated by dotted line $x$. Fig. 6 is a section through the bolt in the plane indicated by dotted line $y$. Fig. 7 shows the bolt applied.

Similar letters of reference indicate corresponding parts in the several figures.

This invention relates to expansion-bolts which are designed for application to brick and stone walls, and wherein it is desired to secure the bolts rigidly into such walls, and so that they will not be liable to draw out or become loose. My invention consists in constructing bolts of this description so that in the act of securing them into a wall they will receive and permanently confine into their outer ends screw-tapped blocks or nuts, thus enabling any object to be secured to a bolt so applied to a wall by means of screws, as will be hereinafter explained.

The following description of my invention will enable others skilled in the art to understand it.

In the accompanying drawing, A A represent the two centrally-divided longitudinal halves of my bolt which present external grooves $a\ a$ for more firmly holding into a wall, and enlarged heads $i\ i$ which are the exposed portions of a bolt when confined into a wall. In each one of the heads $i$ a recess, $g$, is made of such size and form as will receive and confine in place a nut, $g'$, when the two halves of the bolt are brought together.

To apply my bolt a hole is drilled into a wall, B, of a gradually-increasing diameter, and after inserting the nut $g'$ into its recess $g$, and partly introducing the wedge C into the grooves $b$, between the portions A A, the bolt is inserted into its hole and forcibly driven therein, the effect of which is to expand the stem portions of the bolt, and thus firmly and permanently secure the bolt in place.

The wedges used may be constructed with ribs $e$ on their reduced ends, or they may be made without these ribs.

I prefer to make the hole which conducts the point of the screw $h$ to the nut $g'$ flaring, so that it will readily guide the screw to the hole through the said nut.

I am aware that expanding-bolts, nails, and spikes are old, and therefore I do not claim, broadly, such devices.

What I claim as new, and desire to secure by Letters Patent, is—

1. The longitudinal portions A A of an expanding-bolt, constructed with recesses $g$ in them for the purpose of confining therein a nut, $g'$, substantially as described.

2. The two halves A A, grooved at $b\ c$, and otherwise constructed, substantially as described.

DAVID L. BARTLETT.

Witnesses:
 ERNEST A. ROBBINS,
 SAML. S. WALLACE.